UNITED STATES PATENT OFFICE.

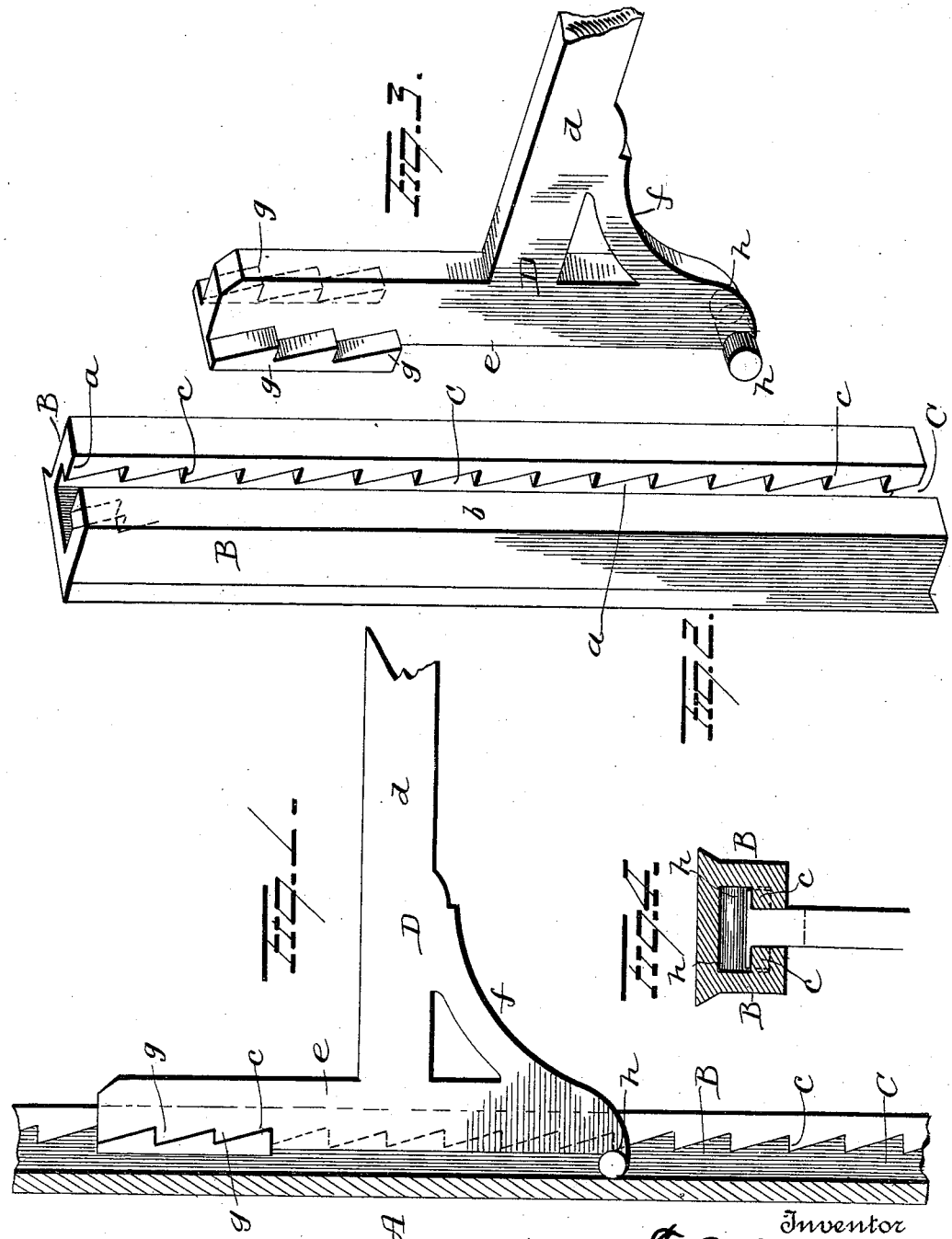

FRANK E. HARTZELL, OF ALLIANCE, OHIO.

BRACKET.

SPECIFICATION forming part of Letters Patent No. 565,539, dated August 11, 1896.

Application filed March 28, 1895. Serial No. 543,547. (No model.)

*To all whom it may concern:*

Be it known that I, FRANK E. HARTZELL, of Alliance, in the county of Stark and State of Ohio, have invented certain new and useful Improvements in Brackets; and I do hereby declare the following to be a full, clear, and exact description of the invention, such as will enable others skilled in the art to which it appertains to make and use the same.

My invention relates to an improvement in brackets; and it consists in certain novel features of construction and combinations of parts, which will be hereinafter more fully described, and pointed out in the claim.

In the accompanying drawings, Figure 1 is a view in vertical section of my improvement. Fig. 2 is a detached view of the support. Fig. 3 is a detached view of the bracket. Fig. 4 is a section of Fig. 1.

A represents a support provided with forwardly-projecting sides B B, between which is formed a guideway C, the entrance or mouth of which is contracted, as shown at $a$. This contracted portion is formed by the inwardly-projecting flanges $b\ b$, which latter constitute means for preventing the escape or accidental displacement of the bracket, as will be hereinafter more fully explained. The interior face of each flange $b$ is provided with a series of ratchet-teeth $c$, which extend substantially throughout the entire length of said flanges and are adapted to engage similar teeth located on the bracket.

Bracket D is composed of an arm $d$, an upright $e$, and a brace $f$, which latter is adapted to strengthen and retain said arm and upright in their normal or operative position. On each side of the upright $e$ and preferably near the upper end thereof is located a series of ratchet-teeth $g$, while the opposite or lower end thereof is provided with rounded shoulders or projections $h\ h$, said teeth and shoulders constituting the means whereby the bracket is locked in any desired position within the guideway heretofore described. Flanges $b\ b$ are cut away at the top a sufficient distance to permit the insertion of bracket D when the latter is introduced within guideway C, and the bracket can be adjusted to any desired position. The bracket is retained in any position by the meshing of ratchet-teeth $c$ and $g$, respectively, while said teeth, together with shoulders $h\ h$, also prevent said bracket from falling out of the guideway C.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

The combination with a support having a pair of vertical L-shaped flanges projecting therefrom with a guideway between them and ratchet-teeth located on the inner faces of said flanges, of a bracket provided with a pair of outwardly-projecting rounded shoulders adapted to operate in the guideway and having a multiplicity of teeth thereon adapted to engage the teeth on the flanges of the support, substantially as set forth.

In testimony whereof I have signed this specification in the presence of two subscribing witnesses.

FRANK E. HARTZELL.

Witnesses:
J. W. CRAINE,
J. F. REHN.